Jan. 6, 1970     M. H. P. SOUILLARD     3,488,559
DEVICE FOR THE DETECTION OF DEFECTS TO THE GROUND
AND THE PROTECTION OF LINE PORTIONS
OF A THREE-PHASE SYSTEM HAVING
A GROUND NEUTRAL CONDUCTOR
Filed Aug. 28, 1967     5 Sheets-Sheet 1
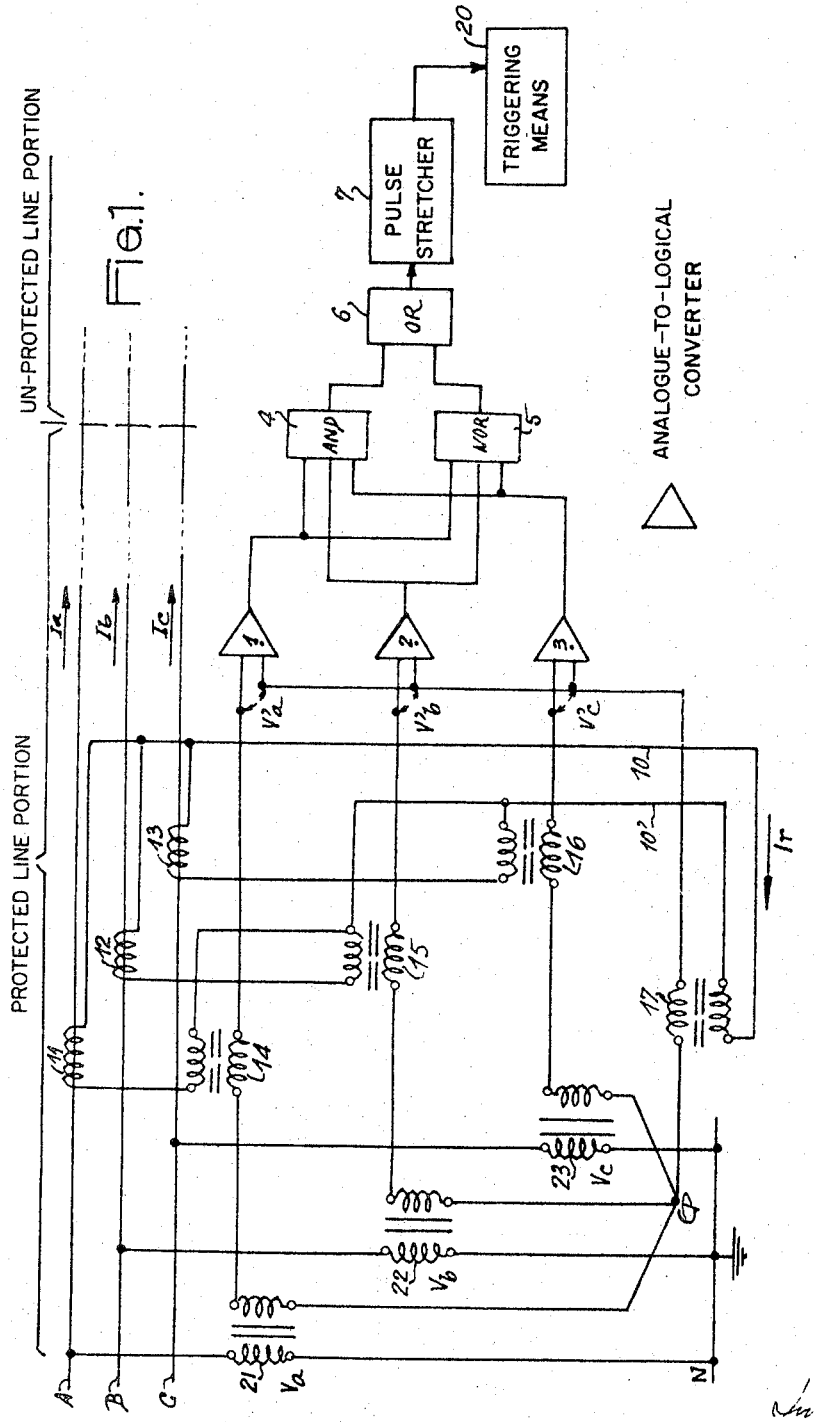

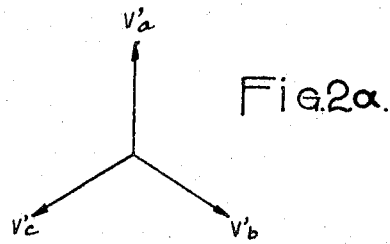
Fig.2a.
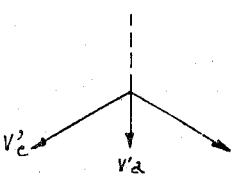
Fig.2b.
Defect. aN
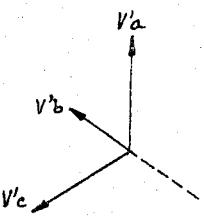
Fig.2c.
Defect. bN
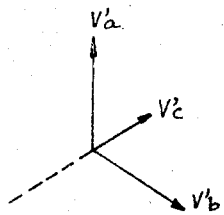
Fig.2d.
Defect. cN.
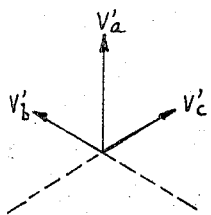
Fig.2e.
Defect. bcN
Fig.2f.
Defect. acN.
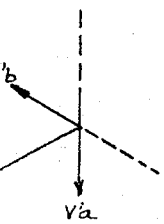
Fig.2g.
Defect. abN.

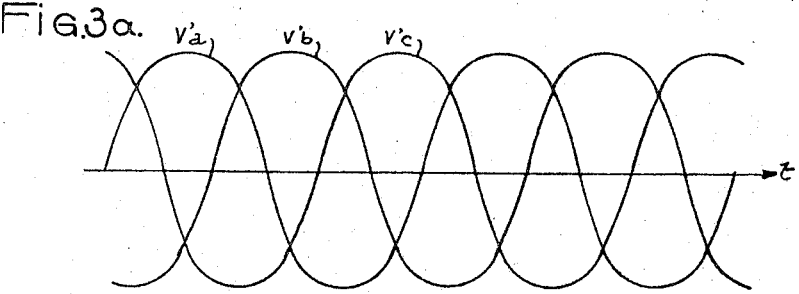
Fig.3a.
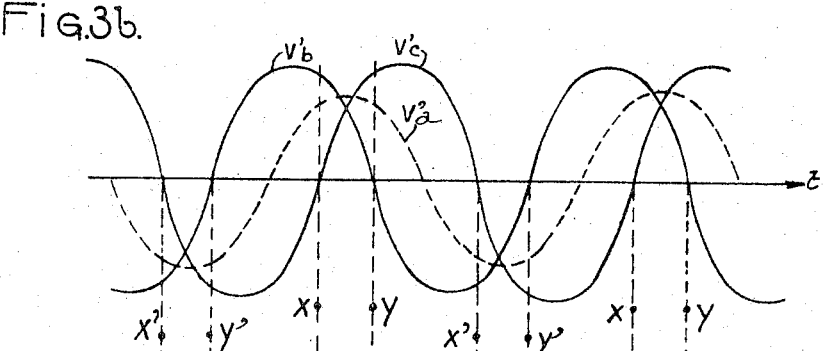
Fig.3b.
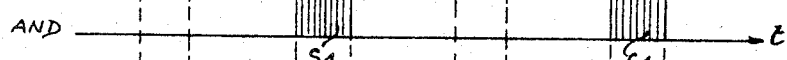
Fig.3c. AND
Fig.3d. NOR
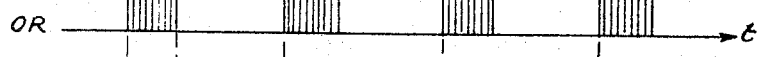
Fig.3e. OR
Fig.3f.

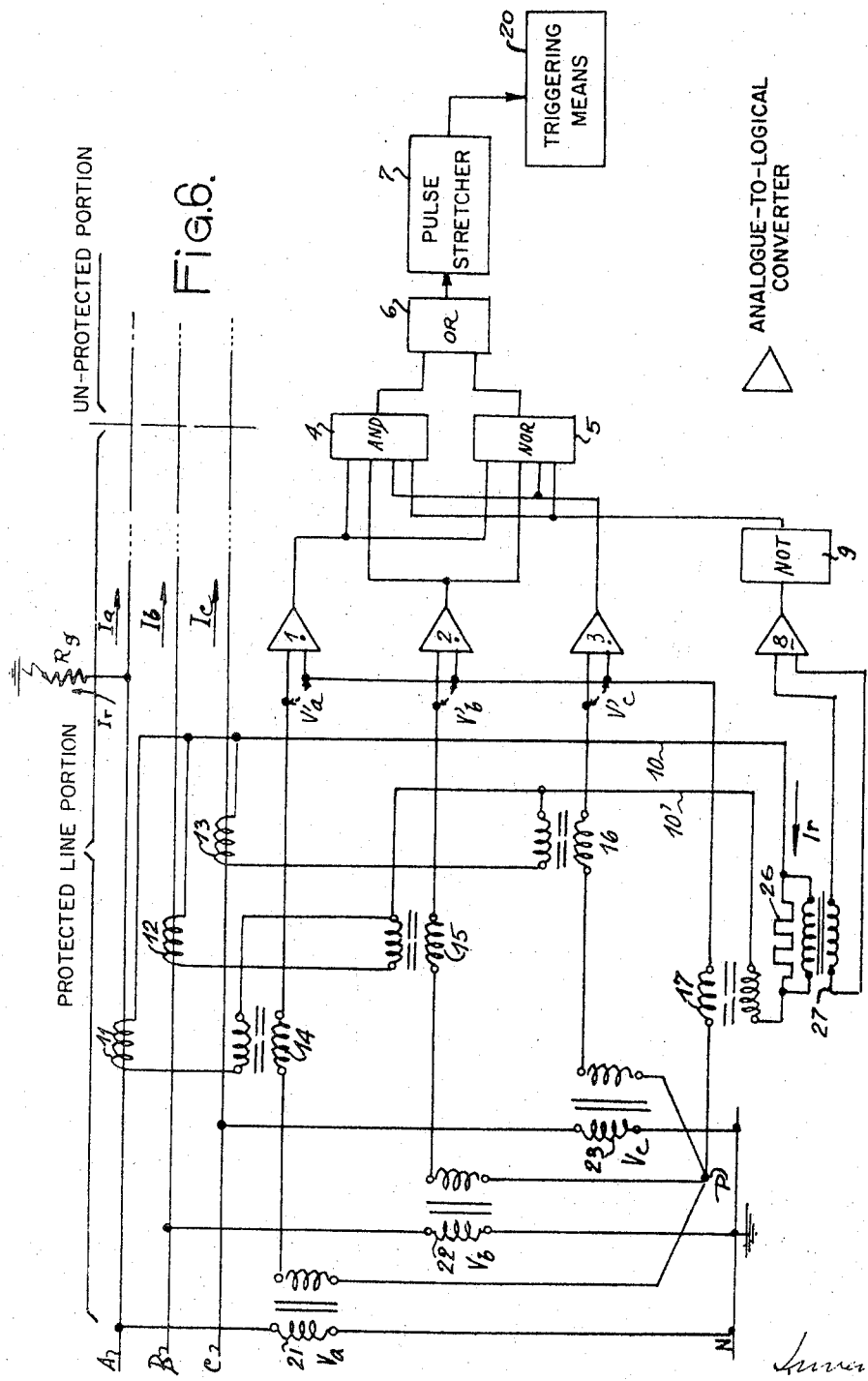

United States Patent Office 3,488,559
Patented Jan. 6, 1970

3,488,559
DEVICE FOR THE DETECTION OF DEFECTS TO THE GROUND AND THE PROTECTION OF LINE PORTIONS OF A THREE-PHASE SYSTEM HAVING A GROUND NEUTRAL CONDUCTOR
Michel Henry Pierre Souillard, Fontenay-aux-Roses, France, assignor to Compagnie des Compteurs, Paris, France, a company of France
Filed Aug. 28, 1967, Ser. No. 663,726
Claims priority, application France, Sept. 12, 1966, 75,972
Int. Cl. H02h 1/02, 1/04, 3/00
U.S. Cl. 317—18
9 Claims

ABSTRACT OF THE DISCLOSURE

Device for the detection and protection of defects to the ground in a three-phase system with a grounded neutral conductor comprising transformers and image impedances associated with each phase of the circuit, an impedance common to the three phases, analogue-to-logical converter-amplifiers connected to said impedances and to said common impedance and at least a logical circuit AND controlled by said converter-amplifiers and emitting a data for the actuation of a trigger.

---

The present invention relates to a device for the detection of defects to the ground and the protection of line portions of a given length and in both directions in a three phase system having a grounded neutral conductor.

The device according to the invention comprises only static means and is particularly provided for measuring directional distance in all defects to the ground (defects between a phase and the ground, defects between two phases and the ground) which may occur in a three-phase system, and does not use any commutator or switching means. Moreover, it comprises only one detector for the three measured magnitudes occurring during its functioning, and has no filter of symmetrical components nor any filter of mean values thereby resulting in a simple and economical apparatus. Further, the functioning of the device is particularly fast, since, as it will be explained in the disclosure, its maximum response time is about one third of a period, or 6.66 milliseconds for a 50-cycle system.

The device according to the invention is essentially characterized in that it comprises three circuits respectively connected to the input of three analogue-to-logical converter-amplifiers, each one of those circuits comprising three elements in series, namely:

The secondary winding of a transformer, the primary of which is connected between a phase and the ground, An image mutual-inductance identical for the three circuits, whose value represents the impedance of the portion of line to be checked and protected and whose, its argument is the same as the argument of the direct impedance of the line, said image mutual-inductance being fed by a current proportional to the current going through the respective phase, and An impedance common to the three phases and connected on one hand to the middle point of the transformers secondary windings and, on the other hand, to the input of said analogue-to-logical converter-amplifiers thus providing logical data depending on the respective phase.

The respective outputs of the analogue-to-logical converters are connected on the one hand, to a logical circuit AND and on the other, to a logical circuit NOR, the outputs of the aforementioned logical circuits being connected to a logical circuit OR. The output of this OR circuit is connected to a temporary memory unit or pulse-stretcher which is connected to system triggering means.

The invention will be better understood by way of the following disclosure and the accompanying drawings, which show in an illustrative and by no means limitative manner a form of the invention.

FIGURE 1 is a diagram of a device for the detection of defects to the ground in a three three-phase system, according to the invention, in which the impedance is used as an electrical measuring magnitude.

FIGURES 2a–2g are diagrams showing the vectorial situation of the voltages used in the device in a normal flow system and in all the different types of defects between phase and ground occurring in the portions of line to be checked or protected.

FIGURES 3a–3f are graphs showing how the device functions according to the invention, when a defect between a phase and the ground occurs in the portion of line to be checked or protected.

FIGURE 6 is a diagram of another form of the invention.

Figure 4:
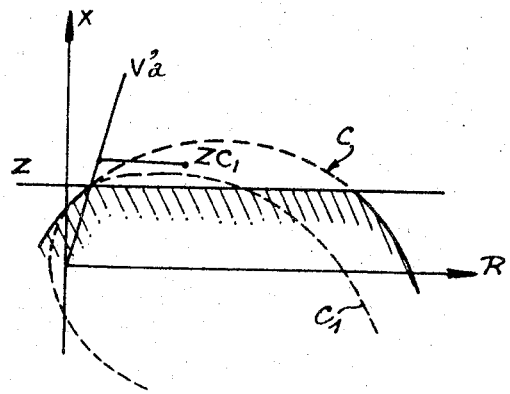
FIGURE 4 is a diagram illustrating the characteristic of the device and showing the influence of a defect to the ground.

On FIGURE 1, letters A, B and C designate the three phases of a three-phase system and N the grounded neutral. Reference numerals 11, 12 and 13 designate three current transformers whose primary windings are respectively incorporated in the phase conductors A, B and C.

One end of each of the secondary windings of the transformers 11, 12 and 13 is respectively connected to one end of the primary winding of image mutual-inductances 14, 15, 16. Those mutual inductances are identical to each other and their value Z represents the impedance of the portion of line to be protected or checked. This impedance Z has the same argument as the direct impedance per phase $3_z$ of the line. The secondary windings of transformers 11, 12, 13 are connected one to the other by their other end; similarly the other ends of the primary windings of the image mutual inductances 14, 15, 16 are connected to each other. The common connection points of the secondaries of transformers 11, 12, 13 on the one hand, and of the primaries of the mutual inductances 14, 15, 16, on the other hand, are connected by way of conductors 10, 10' respectively to the primary winding of an image mutual inductance 17 of a value KZ, where K is a coefficient called coefficient of ground impedances defined by the known relation:

$$K = \frac{z_1 - z_0}{3z_d}$$

$z_0$ being the homopolar impedance of the line.

21, 22 and 23 designate three voltage transformers whose primary windings are respectively connected between one of the phases and the grounded neutral N. One end of each of the secondary windings of said transformers is connected to a common point P, which is connected to one end of the secondary windings of the image mutual inductance 17. The secondary winding of the voltage transformers 21, 22 and 23 are moreover connected respectively at the other ends to the secondary windings of the mutual inductances 14, 15 and 16 so as to establish three circuits leading respectively to the inputs of the converter-amplifiers 1, 2 and 3, each of those circuits comprising the secondary winding of one of said voltage transformers, the secondary winding of one of the mutual inductance 14, 15 and 16 and the secondary winding of the mutual inductance 17.

The circuit of amplifiers 1, 2 and 3 is designed in known manner so that they function as an analogue-to-logical converter transforming their respective input voltages into logical signals with two states (0 and 1), the phases of said signals being maintained with respect to those of the input voltages.

The outputs of amplifiers 1, 2 and 3 are connected on the one hand to a logical circuit AND (reference number 4) and on the other hand, to a logical circuit NOR (reference number 5). The outputs of those logical circuits are connected to a logical circuit OR (reference number 6). Finally, the output of this OR circuit is connected to a temporary memory circuit 7 or pulse stretcher of any known type. The output of this circuit 7 is connected to any suitable type triggering means 20.

If one represents by $I_a$, $I_b$, $I_c$, $I_r$, the currents respectively circulating in the three phases A, B, C, and the neutral wire when a defect between one or two phases and the ground, by $V_a$, $V_b$, $V_c$, the voltages between each one of the phases and the ground, and by $V'_a$, $V'_b$, $V'_c$, the voltages appearing respectively at the inputs of amplifiers 1, 2 and 3, one sees that those three voltages $V'_a$, $V'_b$, $V'_c$ have the following relationship:

$$V'_a = V_a - Z(I_a + KI_r) \quad (1)$$
$$V'_b = V_b - Z(I_b + KI_r) \quad (2)$$
$$V'_c = V_c - Z(I_c + KI_r) \quad (3)$$

In order to make well understood the functioning of the device according to the invention, one will consider, for example, the case of a defect between the phase A and the ground.

One knows that in that case, the voltage $V_a$ may be written in the following way:

$$V_a = z_d I_a + \frac{z_d - z_0}{3} I_r \quad (4)$$

If in Equation 1, one substitutes $V_a$ for its value given by Equation 4, being remembered that $$k = \frac{z_d - z_0}{3 z_d}$$

one obtains after calculus:

$$V'_a = (z_d - Z)(I_a + K \cdot I_r)_r$$

Thus one sees that when the value $z_d$ (direct impedance of the phase with a defect to the ground) is smaller than the value of the reference impedance Z (impedance of the portion of line to be protected) the polarity of the voltage $V'_a$ is always inverted with respect to that of voltage $V_a$. This case occurs when the defect is situated, in relation to the place of the protecting device, at a distance shorter that the length of the portion of line to be protected.

The diagrams of voltages $V'_a$, $V'_b$, $V'_c$ of FIGURES 2a-2g show what has been just said.

The diagram of FIGURE 2a shows the vectors of the three voltages $V'_a$, $V'_b$, $V'_c$ in a normal functioning. Those three vectors are 120° dephased one from each other. Actually, as in this case $I_r$ is null, one sees from Equations 1, 2 and 3 that the voltages $V'_a$, $V'_b$ and $V'_c$ are respectively equal to $V_a$, $V_b$ and $V_c$ minus the drop in voltage $Z.I_a$, $Z.I_b$ and $Z.I_c$. Those values have same argument and roughly same modulus.

The diagrams of FIGURES 2b, 2c and 2d show respectively the vectors of said voltages $V'_a$ $V'_b$ and $V_c$ in the case of a defect in one of the phases A, B or C in relation with the ground, within the portion of line to protect.

The diagrams of FIGURES 2e, 2f, 2g show respectively the vectors of said voltages $V'_a$, $V'_b$ and $V'_c$ in the case of a defect of two phases in relation with the ground within the portion of line to protect.

The diagrams of FIGURES 2b to 2g show that in all cases when a defect to the ground occurs, with one phase or with two phases, an evident condition that the direct impedance of the defective line be smaller than the reference impedance Z, the greater difference of phase between the voltage $V'_a$, $V'_b$ and $V'_c$ taken two by two, is less than 180°. One sees that in those diagrams, the three vectors $$\vec{V_a'}, \vec{V_b'}, \vec{V_c'}$$

are in the same half-plan. Thus, there must be a time interval during which the three voltages are simultaneously of the same polarity, positive or negative—see FIGURE 3b.

The logical circuits 4 and 5, which continuously receive logical signals coming from amplifiers 1, 2 and 3, detect the coincidence of the instantaneous polarities of the three voltages $V'_a$, $V'_b$ and $V'_c$. The logical circuit AND reference number 4) sends a signal equal to 1 during the time interval when those three signals are simultaneously positive. The logical circuit NOR (reference number 5) sends a signal equal to 1 during the time interval when said three voltages are simultaneously negative. The logical circuit OR (reference number 6) sends a signal equal to 1 when one or both of its inputs is at the level 1. The temporary memory circuit 7 transforms the succession of those signals of a small duration into a permanent signal (see FIGURE 3f) which excites the triggering means 20 connected at the output of said memory circuit.

FIGURES 3a-3f show operation of the device according to the invention when a defect occurs between the phase A and the ground in a portion of the line to be checked or protected.

Curves 3a represent the three voltages $V'_a$, $V'_b$ and $V'_c$ in a normal procedure as a function of time $t$.

The curves of FIGURE 3b represent the three voltages when a defect occurs between the phase A and the ground within a portion of the line to be checked or protected. As above explained, the voltage $V'_a$ (represented in a dotted line) then becomes inverted and one sees that in the intervals $x-y$, the three voltages are simultaneously positive, while in the intervals $x'-y'$, they are simultaneously negative. Thence it follows that at the output of the logical circuit AND is produced a signal 1 (reference $S_1$ of FIGURE 3c) which corresponds to the intervals $x-y$, while at the output of the circuit NOR is produced a signal 1 (reference $S'_1$ of FIGURE 3d) which corresponds to the intervals $x'-y'$. Those signals are successively received in the logical circuit OR which produces signals 1 (FIGURE 3e). Those latter signals are sent in the temporary memory circuit or pulse stretcher where they are transformed into a permanent signal as it appears on FIGURE 3f.

It would be possible to use only one logical circuit AND or NOR, thereby eliminating the logical circuit OR. But it is much more advantageous to use logical circuits AND, NOR and OR, as a much more rapid response is obtained in the case of a defect to the ground. This response, as seen on FIGURE 3f, always occurs within a time interval less than one third of a period while with only one logical circuit AND or NOR, it could reach nearly one period.

The invention has been described in reference to a real short circuit defect to the ground without any resistance. Were the defect to present a resistance, the detection of the defect could be affected with an error by excess, that is to say that a defect could then be detected while this defect would have occurred beyond the limit of the line portion to be protected. Actually, as shown in FIGURE 4, as to the coordinates R–X (resistance-capacitance), the characteristic of the relay constituting the device according to FIGURE 1 is a circle C and it may occur that a defect on the line beyond the protected zone and presenting a resistance be detected as being inside the zone to be protected as it is shown in $Z_{c1}$ on FIGURE 4, because then, the impedance so estimated corresponds to an impedance within the protected zone.

Figure 5:
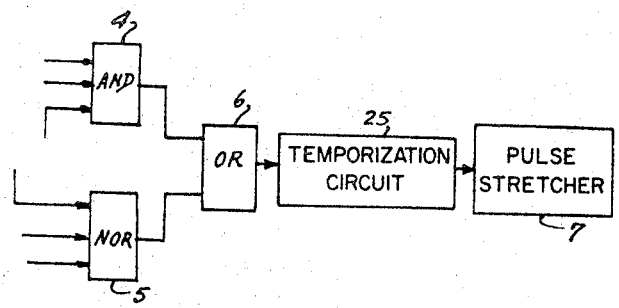
FIGURE 5 is a diagram illustrating a further embodiment of the invention.

In order to improve the quality of the measurement, it is advantageous, as shown on FIGURE 5, to put between the OR logical circuit 6 and the temporary memory device 7, a temporization circuit 25 which lets pulses go through from the logical circuit 6 only when their duration exceeds a given value. The chosen value of the temporization duration results in a corresponding modification of the characteristic of the relay, which characteristic becomes then roughly elliptical (curve $C_1$, FIGURE 4) which has for its effect a reduction in the extent of the protected zone due to the resistance of this defect. FIGURE 4 shows actually that in this case, the defect of an impedance $Z_{c1}$, outside of the protected zone is not detected.

Another embodiment of the invention is shown on FIGURE 6. This embodiment is particularly suitable when the defect to the ground presents a resistance. FIGURE 6 illustrates the case of a defect between the phase A and the ground having a resistance $R_g$. The voltage $V_a$ as seen from the device terminals is given by the equation $$V_a = z_d I_a + \frac{z_d - z_o}{3} I_r + v_f$$

in which $v_f$ represents the voltage at the defect terminals. As practically, the homopolar impedances at both sides of the defect have the same argument, this voltage $v_f$ is in phase with the residual current $I_r$ and is proportional to the resistance of the defect. $\alpha$ being a real coefficient the relation $v_f = \alpha R_g I_r$ obtains. The voltage $V'_a$ is then given by the equation $$V'_a = (z_d - Z)(I_a + K I_r + \alpha R_g I_r$$

A defect to the ground occuring at the limit of the zone to be protected is thus characterized by $z_d = Z$, that is to say by $$V'_a = \alpha R_g I_r$$

A defect at the point of equilibrium $z_d = Z$ is thus characterized by the fact that the compensated voltage of the defective phase which appears at the input terminal of amplifier 1 is in phase with the residual current.

FIGURE 6 is different from FIGURE 1 by the fact the residual current $I_r$ feeds an amplifier 8 through an isolation transformer 27 the primary of which is connected to the terminals of a shunt 26 through which passes said current. The signal at the output of the amplifier 8 is sent through a logical circuit NOT 9 at the input of the logical circuits AND 4 and NOR 5. The circuits 4 and 5 receiving also the logical signals from the amplifiers 1, 2 and 3, the logical circuit NOR 5 transmits a signal of level 1 during the time interval when the three voltages are negative and the residual current is positive, while the logical circuit AND 4 transmits a signal of level 1 during the time interval when the three voltages are positive and the residual current is negative. The circuit OR 6 connected to the output of the circuits 4 and 5 transmits a signal of level 1 one or the other of its inputs is at level 1. The temporary memory circuit or pulse stretcher 7 converts the sequence of those low duration signals in a permanent signal which is used to act on the triggering means 5.

I claim:

1. Device for the detection of defects to the ground and the protection of the line portions of a given length in a three-phase system with a grounded neutral conductor, characterized in that it comprises three circuits respectively connected to the inputs of three analogue-to-logical converter amplifiers, each one of those circuits comprising three elements connected in series, namely:
  the secondary winding of a transformer the primary of which is connected between a phase and the ground,
  an image mutual-inductance identical for the three circuits, whose value represents the impedance of the portion of line to be checked and protected and whose argument is the same as the argument of the direct impedance of the line, said image mutual inductance being fed by a current proportional to the current going through the respective phase, and
  an impedance common to the three phases and connected on one hand to the middle point of the transformer secondary windings and on the other hand to the inputs of said analogue-to-logical converter-amplifiers thus providing logical data depending on the respective phase.

2. Device according to claim 1 in which the respective outputs of the analogue-to-logical amplifier-converters are connected to the input of a logical circuit AND the output of which is connected to triggering means of the three-phase system.

3. Device according to claim 1 in which the respective outputs of the analogue-to-logical amplifier-converters are connected to the input of a logical circuit NOR the output of which is connected to triggering means of the three-phase system.

4. Device according to claim 1 in which the respective outputs of the analogue-to-logical amplifier-converters are connected, on the one hand, to a logical circuit AND and on the other hand to a logical circuit NOR, the outputs of said logical circuits being connected to a logical circuit OR, the output of which is connected to triggering means of the three-phase system.

5. Device according to claim 2 in which the triggering means of the three-phase system comprises a temporary memory device or pulse stretcher.

6. Device according to claim 3 in which the triggering means of the three-phase system comprises a temporary memory device or pulse stretcher.

7. Device according to claim 4 in which the triggering means of the three-phase system comprises a temporary memory device or pulse stretcher.

8. Device according to claim 4 in which a temporization circuit is interposed between the logical circuit OR and the triggering means of the three-phase system.

9. Device according to claim 4 in which said impedance common to the three phases is constituted by one winding of a transformer, the other winding of which is electrically connected to the three phases to be traversed by a defect current occurring when a defect appears between at least one phase and the ground, an additional analogue-to-logical amplifier-converter being provided and which is fed by said defect current through a transformer, and said additional amplifier-converter feeding a logical circuit NOT whose output is connected to said logical circuits AND and NOR.

References Cited

UNITED STATES PATENTS

| | | | |
|---|---|---|---|
| 3,178,616 | 4/1965 | Blackburn et al. | 317—36 X |
| 3,277,345 | 10/1966 | Waldron | 317—36 |
| 3,369,156 | 2/1968 | Souillard | 317—36 |
| 3,374,399 | 3/1968 | Dewey | 317—36 |

LEE T. HIX, Primary Examiner

J. D. TRAMMELL, Assistant Examiner

U.S. Cl. X.R.

317—36